United States Patent [19]
Pascher

[11] 3,790,302
[45] Feb. 5, 1974

[54] TAIL ROTOR MOUNTING FOR CONING RELIEF
[75] Inventor: Robert L. Pascher, Dallas, Tex.
[73] Assignee: Textron Incorporated, Providence, R.I.
[22] Filed: Oct. 10, 1972
[21] Appl. No.: 295,888

[52] U.S. Cl.................. 416/134, 416/102, 416/136
[51] Int. Cl. ........................................... B64c 27/48
[58] Field of Search.................... 416/122, 134–136, 416/141, 102

[56] References Cited
UNITED STATES PATENTS
2,949,965   8/1960   DeTore et al....................... 416/102
3,556,673   1/1971   Killian................................ 416/134
3,652,185   3/1972   Cresap................................ 416/134
3,700,352   10/1972  Gorndt............................ 416/141 X

*Primary Examiner*—Everette A. Powell, Jr.

[57] ABSTRACT

Helicopter tail rotors provide anti-torque forces to maintain stabilized flight and further provide aircraft heading control. Aerodynamic forces generated on the rotor blade cause the tip thereof to move out of line with the pitch change axis of the blade, an effect known as "coning," which produces undesirable forces on the rotor blade, the hub and the tail rotor control system.

Each tail rotor blade is attached to a blade grip which is coupled to a yoke through laminated elastomeric bearings that provide in-plane stiffness while permitting blade coning in such a manner as to relieve the undesired coning effect forces.

19 Claims, 4 Drawing Figures

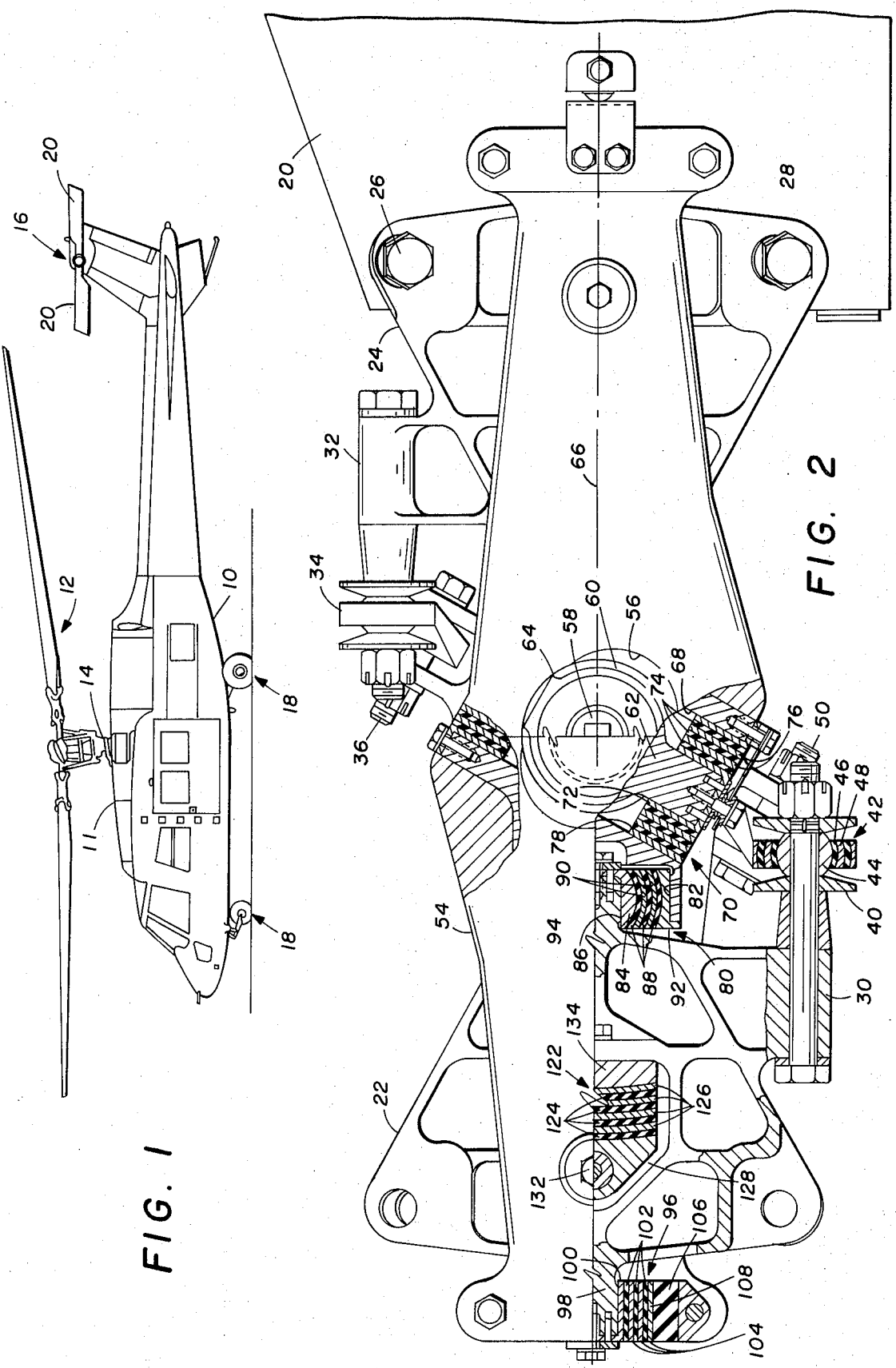

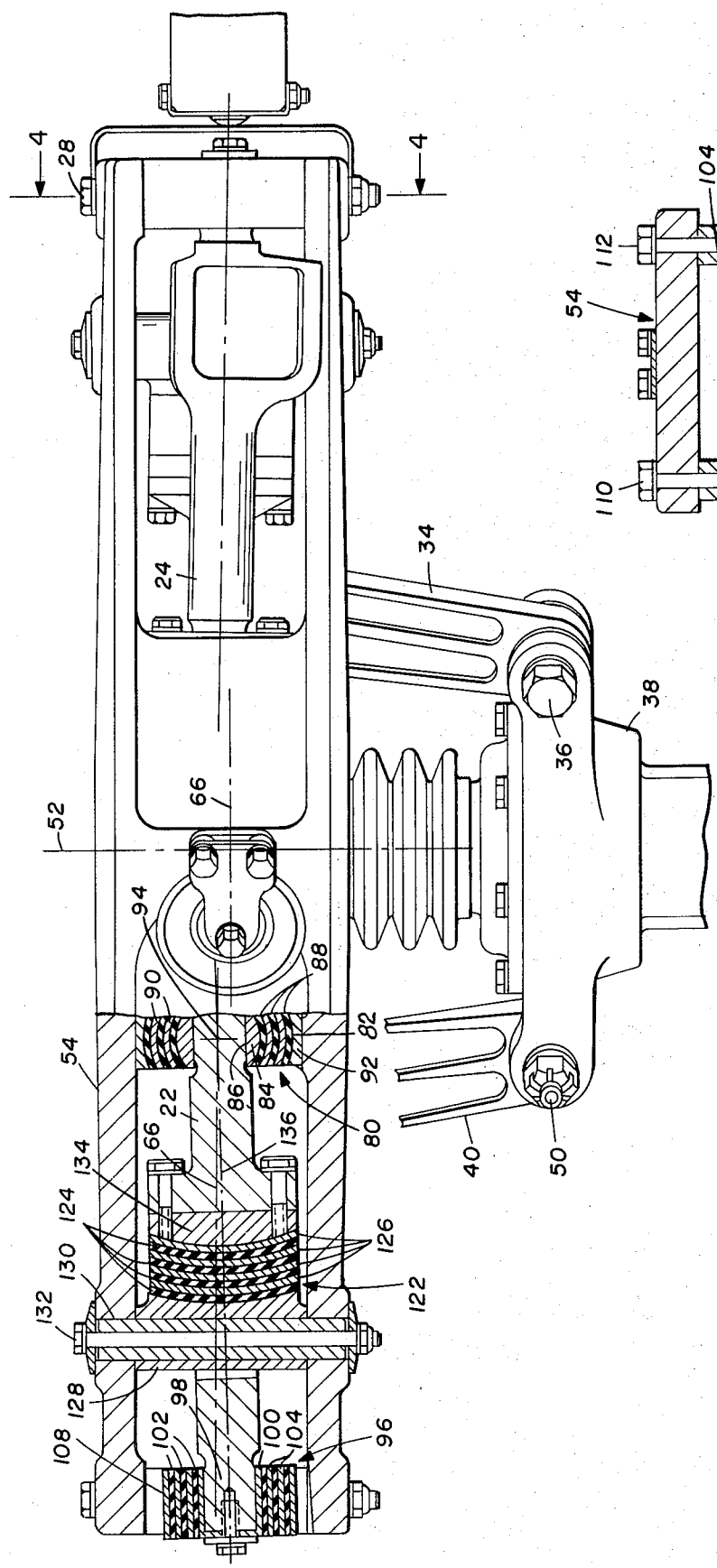
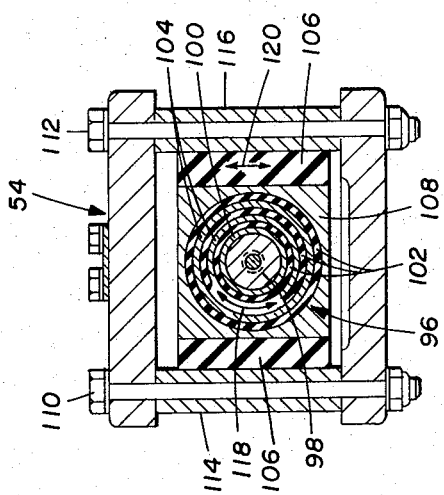
FIG. 3
FIG. 4

TAIL ROTOR MOUNTING FOR CONING RELIEF

This invention relates to a helicopter tail rotor mounting and more particularly to a mounting having flexible supports that provides coning relief with in-plane rotor blade stiffness.

Tail rotors on helicopters are provided with adjustable collective pitch control for aircraft heading selection. At certain valves of rotor blade pitch, aerodynamic forces are generated that cause bending of the blades into a generally conical configuration. This coning produces undesirable high loads in the rotor hub and also undesirable forces that feed back through the blade and grip into the tail rotor control system. Relief from the coning effects is therefore not only desirable, but essential for reliable operation.

A feature of the present invention is to provide a tail rotor hub assembly for mounting the rotor blades on a combination of flexible supports for relief from coning effects. Another feature of the present invention is to provide a tail rotor assembly having blade mountings for relief from coning effect produced forces while providing in-plane rotor blade stiffness. Still another feature of the present invention is to provide a tail rotor assembly having blade mountings for relief from coning effects, and to provide in-plane rotor stiffness and pitch adjustment.

In accordance with the present invention, a tail rotor mounting assembly includes elastomeric bearings for mounting each tail rotor blade to a driven pylon or mast to provide coning relief while at the same time harnessing centrifugal forces, permitting pitch adjustment, and providing lead-lag (in-plane) stiffness.

More particularly, in accordance with the present invention, a helicopter tail rotor blade mounting for a tail rotor assembly includes a rotor yoke pivotally mounted to rotate on a supporting mast. Each rotor blade of the rotor assembly is mounted to a blade grip that includes pitch control means for feathering the rotor blade. The inboard end of each blade grip is flexibly mounted to the rotor yoke and the outboard end is mounted to the outboard end of the rotor yoke by means of a translation bearing. The translation bearing has relative translation freedom in the plane perpendicular to the plane of rotation of the rotor blades.

A more complete understanding of the invention and its advantages will be apparent from the specification and claims and from the accompanying drawings illustrative of the invention.

Referring to the drawings:

FIG. 1 is a pictorial view of a helicopter with a single main rotor and a tail rotor;

FIG. 2 is a plan view, partially in section, of a tail rotor mounting assembly to provide coning relief and inplane blade stiffness;

FIG. 3 is an end view of the rotor blade assembly of FIG. 2, also partially cutaway; and FIG. 4 is a sectional view of the feathering and coning relief bearing of the mounting of FIG. 2 taken along the line 4—4.

Referring to FIG. 1, the helicopter shown comprises an elongated fuselage or hull 10 having a pylon 11 housing an engine and the associate gearing required to rotate a lifting rotor 12 about a vertical axis 14. The tail portion includes an anti-torque tail rotor assembly 16 as required on single main rotor helicopter designs to provide in-flight stability and aircraft control heading. A landing gear 18 is provided for supporting the helicopter.

To control the heading of the helicopter, a pilot operates control pedals which, through linkage, control the pitch of each rotor blade 20 of the tail rotor assembly 16. As previously noted, certain values of rotor blade pitch produce aerodynamic forces on the rotor blade that cause an out-of-plane deflection of the tip thereof with reference to the pitch change axis of the blade. It is a feature of the present invention to relieve forces on the rotor assembly hub produced by coning of the rotor blades.

Basically, a rotor blade 20 of the assembly 16 is mounted to a yoke by means of a blade grip wherein the yoke and blade grip have a first elastomeric coupling along the yoke longitudinal axis. This elastomeric coupling is a radial bearing having spherical symmetry centered at the yoke axis. A second elastomeric bearing, remote from the first bearing, couples the yoke to the blade grip to permit rotation of the blade about the longitudinal yoke axis. This second elastomeric bearing is mounted to provide translation movement in the coning direction and rigidity in the lead-lag or in-plane direction. An elastomeric thrust bearing couples the yoke to the blade grip intermediate the first and second bearings in a spherical configuration centered at the yoke axis.

Referring to FIGS. 2–3, the rotor blades 20 (only one shown) are mounted to blade grips 22 and 24 at the outboard end thereof by means of bolts 26 and 28, as shown for the grip 24. Each of the blade grips 22 and 24 is substantially triangular in configuration and includes a pitch arm 30 and 32, respectively, for pitch control. Coupled to the pitch arm 32 is a pitch link 34 attached at its lower end by means of a bolt 36 to a crosshead 38. Coupled to the pitch arm 30 is a pitch link 40 by means of a laminated elastomeric bearing 42. A similar bearing (not shown) is provided in the coupling between the pitch link 34 and the pitch arm 32. These bearings are similar and comprise a spherical core 44 with alternate layers of elastomeric elements 46 and metallic elements 48. Each of the elastomeric elements 46 and the metallic elements 48 have a generally spherical configuration to conform with the spherical configuration of the core 44. The pitch link 40 is coupled to the crosshead 38 by means of a bolt 50.

For the pilot to control the pitch of each of the rotor blades 20 he imparts a longitudinal movement to the crosshead 38 along the axis 52. Such pitch control is conventional and a further description is not deemed necessary for the understanding of the present invention. Typically, a pilot controls the pitch of the tail rotor blades 20 by means of pedal movement.

Each of the blade grips 22 and 24 is flexibly coupled in a manner to be described to a rotor yoke 54 having a central opening 56 for mounting to a mast 58 that rotates to impart motion to the tail rotor assembly 20. To mount the rotor yoke 54 to the mast 58, a trunnion 60 is secured to the upper end of the mast 58 and has two cantilevered bearing surfaces 62 an 64 extending transverse of the axis 52 and oriented at an angle of about 60° with respect to a longitudinal axis 66 of the rotor yoke 54.

A cylindrical opening 68 is provided in the rotor yoke 54 and is fitted with laminated elastomeric flapping bearings 70 (only one shown) pressed onto the bearing surfaces 62 and 64. Each of the flapping bearings 70 includes a bearing cup 72 bolted or otherwise secured to the bearing surface 62, and having an outer diameter to which is secured an elastomeric element 74. Additional elastomeric elements are provided interleaved with metallic elements 76 and enclosed by a mounting ring 78 bolted or otherwise attached to the yoke 54. With such a mounting assembly, the rotor yoke 54 and consequently the entire rotor assembly is free to flap in an out-of-plane direction about the bearing surfaces 62 and 64.

As best illustrated in FIG. 3, the outboard ends of the rotor yoke 54 are forked to form a clevis for receiving the blade grips 22 and 24. Considering now the mounting arrangement for the blade grip 22, the coupling between this blade grip and the rotor yoke 54 is completed by means of three elastomeric bearings which permit changes in pitch of the rotor blade 20 as well as coning relief while opposing the centrifugal force on the blades during rotation to provide in-plane stiffness.

At the inboard end of the blade grip 22 there is provided a laminated, elastomeric, feathering and coning hinge bearing 80 mounted in a cylindrical well 82 having a center axis aligned with the longitudinal axis 66 of the rotor yoke 54. The coning hinge bearing 80 includes a center core 84 having a spherical outer surface and a cylindrical inner diameter mating with a shaft 86 of the blade grip 22. The center core 84 may be bolted or otherwise secured to the shaft 86. Surrounding the center core 84 is a laminated arrangement of elastomeric elements 88 interleaved with metallic element 90. The outermost elastomeric element 88 is encased in a mounting bracket 92 press fit or otherwise secured into the cylindrical well 82.

With the coning and hinge bearing 80 constructed as illustrated by alternate layers of spherical shaped elastomeric and metallic elements, the blade grip 22 is free to rotate in any direction about a center point 94. Although shown as a laminated elastomeric bearing, it will be understood that the bearing 80 may comprise other bearing assemblies that provide the required degree of freedom.

Another of the elastomeric bearings for coupling the blade grip 22 to the rotor yoke 54 is positioned at the outboard end of the yoke and blade grip. A laminated, elastomeric, feathering and coning relief bearing 96 is mounted on a shaft 98 extending from the blade grip 22 and having a center line aligned with the longitudinal axis 66 of the rotor yoke 54. That is, when there are no in-plane or out-of-plane forces being transmitted between the rotor blade 20 and the yoke 54, the center axis of the shaft 98 will be aligned with the longitudinal axis 66.

The relief bearing 96 includes a cup-shaped inner race 100 bolted or otherwise secured to the shaft 98 and having adhered thereto elastomeric elements 102 interleaved with metallic elements 104 to form a laminated structure. The outermost elastomeric element 102 is bonded to metallic block 108 which in turn is bonded to elastomeric members 106, as best illustrated in FIG. 4.

The restraining members 106 are mounted to the outboard end of the rotor yoke 54 by means of bolts 110 and 112 inserted through spacer elements 114 and 116, respectively.

With the relief bearing 96 and the restraining members 106 arranged in the combination as illustrated, the rotor blade 20 attached to the blade grip 22 is free to rotate in a direction indicated by an arrow 118 in order to accommodate pitch change. This arrangement also permits movement of the outboard end of the grip 22 in a direction as indicated by the arrow 120 to permit coning relief.

In addition to the hinge bearing 80 and the relief bearing 96 a laminated, elastomeric, centrifugal thrust bearing 122 is provided for coupling the blade grip 22 to the rotor yoke 54. As the name implies, the thrust bearing 122 carries the radially directed centrifugal thrust forces produced by rotation of the rotor blades 20 around the mast 58. The thrust bearing 122 comprises a series of elastomeric elements 124 interleaved with metallic elements 126 to form a laminated structure. The outboard elastomeric element 124 is adhesively or otherwise attached to a supporting member 128 having a passage therethrough for accepting a mounting pin 130 fitted with a bolt 132. The innermost metallic element 126 is in engagement with a core 134 having a flat surface for bolting to a cross brace of the blade grip 22. The inner surface of the member 128 and the outer surface of the core 134 each has a generally spherical configuration to mate with the general spherical configuration of the elastomeric elements 124 and the metallic elements 126. As mounted, the radius of the spherical element falls on a line coincident with the longitudinal axis 66 of the rotor yoke 54. With this spherical thrust bearing arrangement, coning or flapping movement of the blade grip 22 about the point 94 is permitted with elastomeric elements 106 accommodating such movement while preventing in-plane movement of the grip 22 relative to the yoke 54.

Additional coning relief is provided by the thrust bearing 122 by arranging the spherical elastomeric elements 124 in a lamination with the metallic elements 126 such the center line through the shaft 100 is displaced from the longitudinal axis 66 to the rotor yoke 54. This is best illustrated in FIG. 3 where the axis 136 of the shaft 100 is angularly displaced from the axis 66. This provides "preconing" relief and imparts a permanent coning effect to the rotor blades 20 when in an at rest position. Displacement forces imparted to the rotor blades 20 during pitch changing first must overcome this preconing positioning before coning of the blades takes effect.

Referring to FIG. 3, the pitch axis shaft 98 is mounted in bearing 96 and it must rotate around the axis 66 in order to change rotor blade pitch. However, it will be noted that bolt 132 and the mounting pin 130 extend through the blade grip 22. The manner in which this mounting is constructed to facilitate rotation of shaft 98 upon change of pitch while still having bolt 132 passed through the blade grip 22 will be understood by reference to FIG. 2. In FIG. 2 it will be noted that the grip 22 is integral with the shaft 98. It will further be noted that there is a space between the supporting member 128 and the blade grip which provides clearance between the grip structure and the structure integral with bolt 132 which is secured to the yoke 54. The grip structure is integrally connected to the core member 134 through the elastomeric thrust bearing 122. Thus, centrifugal forces on the grip 22 are transmitted as a compression force from the core member 134 through the elastomeric thrust bearing 122 to the supporting member 128 through which bolt 132 extends. The member 134, the bearing 122, the mounting pin 130 and the mounting bolt 132 are then mechanically interconnected so that the centrifugal forces on the grip are transmitted to bolt 132 and thence to the yoke 54. Because of the presence of the elastomeric bearings 94 and 96, the grip 22 can rotate about the axis 66 to provide a change in pitch while bearing 122 transmits the centrifugal force from the core member 134 to the bolt 132.

With each of the blade grips 22 and 24 coupled to the rotor yoke 54 by the bearings 80, 96 and 122, the rotor blades 20 of the rotor assembly are free to rotate for a pitch change by action of the elastomeric elements in each of the coupling bearings. The hinge bearing 80 and the relief bearing 96 allow the rotor blade to cone with a minimum of forces being transmitted to the rotor yoke 54. The relief bearing 96 in conjunction with the members 106 provide in-plane stiffness to resist centrifugal forces generated by rotation of the rotor assembly.

While only one embodiment of the invention, together with modifications thereof, has been described in detail herein and shown in the accompanying drawings, it will be evident that various further modifications are possible without departing from the scope of the invention.

What is claimed is:

1. A helicopter tail rotor blade mounting with coning relief which comprises:
   a rotor yoke pivotally mounted to rotate with a supporting mast,
   a blade grip and a rotor blade attached thereto at the outboard end of said grip and including pitch control means,
   means for flexibly mounting the inboard end of the blade grip to said yoke, and
   a translation bearing coupling the outboard end of the rotor yoke to said grip for translation freedom of the blade in a direction perpendicular to the plane of rotation while restricting movement relative to said yoke in the plane of rotation thereof.

2. A helicopter rotor blade mounting as set forth in claim 1 wherein said translation bearing includes concentric, laminated, elastomeric elements mounted on the blade grip, and
   parallel elastomeric plates mounted to opposite sides of said elements and spaced apart in the plane of rotation to limit by compression resistance said movement in the plane of rotation and to permit by shear deflection said movement perpendicular to the plane of rotation.

3. A helicopter rotor blade mounting as set forth in claim 1 including a thrust bearing coupled to the blade grip at a point between the inboard and outboard ends thereof and fastened to the rotor yoke.

4. A helicopter rotor blade mounting as set forth in claim 3 wherein said thrust bearing includes spherical, laminated, elastomeric elements coupled to the blade grip and attached to the rotor yoke.

5. A helicopter rotor blade mounting as set forth in claim 1 including flapping bearing means supported on a trunnion attached to said mast and coupled to the rotor yoke for pivotally mounting said yoke to the mast.

6. A helicopter rotor blade mounting as set forth in claim 5 wherein said flapping bearing includes concentric, laminated, elastomeric elements having an inner member supported on said trunnion and an outer circumference surface mounted in an opening of the rotor yoke.

7. A helicopter tail rotor blade mounting with coning relief, comprising in combination:
   a rotor yoke pivotally mounted to rotate with a supporting mast,
   a blade grip and a rotor blade attached thereto at the outboard end of said grip and including pitch control means,
   means for flexibly mounting the inboard end of the blade grip to said yoke,
   a translation bearing coupling the outboard end of the rotor yoke to said grip for translation freedom of the blade in a direction perpendicular to the plane of rotation while restricting freedom of movement relative to said guide in the plane of rotation thereof,
   a trust bearing coupled to the blade grip at a point between the inboard and outboard ends thereof and fastened to the rotor yoke, and
   flapping bearing means supported on a trunnion attached to said mast and coupled to the rotor yoke for pivotally mounting said yoke to the supporting mast.

8. A helicopter rotor blade mounting as set forth in claim 7 wherein said translation bearing includes concentric, laminated, elastomeric elements mounted on the blade grip, and
   parallel elastomeric plates mounted on opposite sides of said elements and spacing apart in the plane of rotation to limit by compression resistance said movement in the plane of rotation and to permit by shear deflection said movement perpendicular to the plane of operation.

9. A helicopter rotor blade mounting as set forth in claim 8 wherein said thrust bearing includes spherical, laminated, elastomeric elements coupled to the blade grip and attached to the rotor yoke.

10. A helicopter rotor blade mounting as set forth in claim 9 wherein said flapping bearing includes concentric, laminated, elastomeric elements having an inner opening supported on said trunnion and an outer circumference surface mounted in an opening of the rotor yoke.

11. A helicopter tail rotor blade mounting with coning relief, comprising in combination:
    a rotor yoke pivotally mounted to rotate with a supporting mast,
    a blade grip and a rotor blade attached thereto at the outboard end of said grip and including pitch control means,
    a hinge bearing coupled to the inboard end of the blade grip and the inboard end of the rotor yoke for flexibly mounting the blade grip to said yoke, and
    means for coupling the outboard end of the rotor yoke and the blade grip for translation freedom of the blade in a direction perpendicular to the plane of rotation while restricting movement relative to said yoke in the plane of rotation thereof.

12. A helicopter rotor blade mounting as set forth in claim 11 wherein said hinge bearing includes spherical, laminated, elastomeric elements coupled to the blade grip and mounted into a fitting of the rotor yoke.

13. A helicopter rotor blade mounting as set forth in claim 12 including flapping bearing means of concentric, laminated, elastomeric elements having an inner member supported on a trunnion and an outer circumference surface mounted in a fitting of the rotor yoke.

14. A helicopter tail rotor blade mounting with coning relief, comprising in combination:
- a rotor yoke pivotally mounted to rotate with a supporting mast,
- a blade grip and a rotor blade attached thereto at the outboard end of said grip and including pitch control means,
- a hinge bearing coupled to the inboard end of the blade grip and the inboard end of the rotor yoke for flexibly mounting the blade grip to said yoke,
- means for coupling the outboard end of the rotor yoke and the blade grip for translation freedom of the blade in a direction perpendicular to the plane of rotation while restricting movement relative to said yoke in the plane of rotation thereof, and
- a thrust bearing coupled to the blade grip at a point between the inboard and outboard ends thereof and fastened to the rotor yoke.

15. A helicopter rotor blade mounting as set forth in claim 14 wherein said thrust bearing includes spherical, laminated, elastomeric elements coupled to the blade grip and attached to the rotor yoke.

16. A helicopter rotor blade mounting as set forth in claim 14 wherein said hinge bearing includes spherical, laminated, elastomeric elements coupled to the blade grip and mounting into a fitting of the rotor yoke.

17. A helicopter rotor blade mounting as set forth in claim 14 including flapping bearing means supported on a trunnion attached to said mast and coupled to the rotor yoke for pivotally mounting said yoke to the mast.

18. A helicopter rotor blade mounting as set forth in claim 17 wherein said flapping bearing includes concentric, laminated, elastomeric elements having an inner member supported on said trunnion and an outer circumference mounted in an opening of the rotor yoke.

19. A helicopter tail rotor blade mounting with coning relief, comprising in combination:
- a rotor yoke,
- a flapping bearing having concentric, laminated, elastomeric elements with an inner surface supported on a trunnion attached to a supporting mast and an outer circumference surface mounted in an opening of said rotor yoke,
- a blade grip and rotor blade attached thereto at the outboard end of said grip and including pitch control means,
- a hinge bearing having spherical, laminated, elastomeric elements coupled to the inboard end of the blade grip and inboard end of the rotor yoke for flexibly mounting the blade grip to said yoke,
- a translation bearing for translation freedom of the blade in a direction perpendicular to the plane of rotation and having concentric, laminated, elastomeric elements mounted on the blade grip and including parallel elastomeric plates mounted to opposite sides of said elements and spaced apart in the plane of rotation to limit by compression resistance movement relative to said yoke in the plane of rotation thereof, and
- a thrust bearing having spherical, laminated, elastomeric elements coupled to the blade grip at a point between the inboard and outboard ends thereof and fastened to the rotor yoke.

* * * * *

PO-1050
(5/69)

UNITED STATES PATENT OFFICE
CERTIFICATE OF CORRECTION

Patent No. 3,790,302                     Dated   Feb. 5, 1974

Inventor(s)  Robert L. Pascher

It is certified that error appears in the above-identified patent and that said Letters Patent are hereby corrected as shown below:

Col. 1, line 9, "valves" should be --values--;
       line 60, after "4-4" insert --of FIGURE 3--.
Col. 4, line 37, "100" should be --98--;
       line 39, "100" should be --98--.
Col. 5, line 4, "94" should be --80--.
Col. 6, line 29, "spacing" should be --spaced--.
Col. 7, line 26, "mounting" should be --mounted--.

Signed and sealed this 2nd day of July 1974.

(SEAL)
Attest:

EDWARD M. FLETCHER, JR.            C. MARSHALL DANN
Attesting Officer                  Commissioner of Patents